United States Patent
Jang

(10) Patent No.: US 8,236,435 B2
(45) Date of Patent: Aug. 7, 2012

(54) BOARD ASSEMBLY FOR RECHARGEABLE BATTERY AND BATTERY PACK USING THE SAME

(75) Inventor: Youngcheol Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 917 days.

(21) Appl. No.: 12/267,738

(22) Filed: Nov. 10, 2008

(65) Prior Publication Data

US 2009/0130494 A1 May 21, 2009

(51) Int. Cl.
*H01M 2/04* (2006.01)
*H01M 2/34* (2006.01)
*H05K 7/02* (2006.01)

(52) U.S. Cl. ............... 429/7; 429/65; 429/177; 361/809

(58) Field of Classification Search ............... 429/7, 65, 429/177; 361/809
See application file for complete search history.

(56) References Cited

U.S. PATENT DOCUMENTS

| 7,537,720 B2 * | 5/2009 | Moon | 429/7 X |
| 7,951,485 B2 * | 5/2011 | Uh | 429/65 X |

FOREIGN PATENT DOCUMENTS

| JP | 2005-317396 | 11/2005 |
| KR | 20-0296075 | 11/2002 |
| KR | 10-2006-0057055 | 5/2006 |
| KR | 10-0585379 B1 | 5/2006 |
| KR | 10-0782990 | 11/2007 |
| KR | 10-0869379 | 11/2008 |
| KR | 10-0930473 | 12/2009 |
| WO | WO 2007/073066 A1 | 6/2007 |

OTHER PUBLICATIONS

Notification of First Office Action, dated Nov. 11, 2010.
English-language abstract of KR 10-2007-0042032.
English-language abstract of KR 10-2007-0080863.
English-language abstract of KR 10-2007-0081559.

* cited by examiner

*Primary Examiner* — Stephen J. Kalafut
(74) *Attorney, Agent, or Firm* — Knobbe, Martens, Olson & Bear LLP

(57) ABSTRACT

A board assembly for a rechargeable battery includes a cover case including a cover plate, and side walls disposed on a circumference of the cover plate and including respective openings that are offset from each other; and a circuit board mounted between the side walls of the cover case.

23 Claims, 8 Drawing Sheets

BOARD ASSEMBLY FOR RECHARGEABLE BATTERY AND BATTERY PACK USING THE SAME

CROSS-REFERENCE TO RELATED APPLICATIONS

This application claims the benefit of Korean Patent Application No. 2007-118054 filed on Nov. 19, 2007, in the Korean Intellectual Property Office, the disclosure of which is incorporated herein by reference in its entirety.

BACKGROUND OF THE INVENTION

1. Field of the Invention

Aspects of the invention relate to a rechargeable battery, and more particularly to a circuit board connected to a battery, a cover case, and a battery pack using the same.

2. Description of the Related Art

Recently, compact portable electronic devices such as a cellular phone, a portable computer, a camcorder, etc., have been actively developed and manufactured. A battery pack is mounted in such portable electronic devices so they can be used in locations where a separate power supply is not available. Recently, a rechargeable battery that can be charged and discharged repeatedly has achieved widespread use because it is more economical than a non-rechargeable battery, which must be replaced when it is discharged. Examples of a rechargeable battery include a nickel-cadmium (Ni—Cd) battery, a nickel-hydrogen or nickel-metal hydride (Ni—MH) battery, a lithium (Li) battery, a lithium ion (Li-ion) battery, etc. A lithium rechargeable battery is particularly attractive because it has a higher energy density per unit weight and an operating voltage of 3.6V, which is three times higher than 1.2V operating voltage of the nickel-cadmium battery and the nickel-hydrogen battery that have usually been used as a power supply of portable electronic devices. Accordingly, the lithium rechargeable battery has become widely used as a power supply of portable electronic devices.

The lithium rechargeable battery uses lithium group oxides as a cathode active material, and a carbon material as an anode active material. Generally, lithium rechargeable batteries can be classified into liquid electrolyte batteries and polymer electrolyte batteries depending on a type of the electrolyte. The lithium ion battery uses a liquid electrolyte, and the lithium polymer battery uses a polymer electrolyte. The lithium rechargeable battery is manufactured in various shapes such as a cylindrical type, a prismatic type, and a pouch type.

Generally, in a process of fabricating the rechargeable battery, an electrode assembly is formed by laminating a cathode plate including a cathode collector on which the cathode active material is coated and to which a cathode tab is connected, an anode plate including an anode collector on which the anode active material is coated and to which an anode tab is connected, and a separator between the cathode plate and the anode plate, and winding the laminated cathode plate, separator, and anode plate to form an electrode assembly. The electrode assembly is inserted into a can type case for the rechargeable battery. Then, a bare cell is fabricated by injecting an electrolyte into the can type case, and closing the can type case with a cap assembly. The bare cell is electrically connected to a protection circuit board, and then the bare cell and the protection circuit board are put into a mold and encapsulated with a melted resin, thereby completing a resin molded type rechargeable.

However, problems may occur during the encapsulating process, such as a defective molding being formed, or the protection circuit board being twisted out of position in the completed resin molded type rechargeable battery.

SUMMARY OF THE INVENTION

According to an aspect of the invention, a board assembly for a rechargeable battery includes a cover case including a cover plate, and side walls disposed on a circumference of the cover plate and including respective openings that are offset from each other; and a circuit board mounted between the side walls of the cover case.

According to an aspect of the invention, the circuit board further includes a terminal, and the cover case further includes a terminal hole corresponding to the terminal of the circuit board.

According to an aspect of the invention, a battery pack includes a rechargeable battery including a cathode and an anode; a cover case including a cover plate including a charge/discharge terminal hole, and side walls disposed on a circumference of the cover plate and including respective openings that are offset from each other; and a protection circuit board mounted between the side walls of the cover case and electrically connected to the cathode and the anode of the rechargeable battery, the protection circuit board including a charge/discharge terminal corresponding to the charge/discharge terminal hole of the cover case.

According to an aspect of the invention, the rechargeable battery further includes an electrode assembly including a cathode plate, an anode plate, and a separator interposed between the cathode plate and the anode plate, the cathode plate, the anode plate, and the separator being wound together; an enclosing assembly enclosing the electrode assembly; and an electrical connecting assembly mounted on the closing assembly and electrically connected to the cathode plate and/or the anode plate.

According to an aspect of the invention, the protection circuit board further includes a mounting assembly soldered to both ends of the protection circuit board; and the mounting assembly is fastened to the enclosing assembly by welding or at least one threaded fastener to mount the protection circuit on the enclosing assembly.

According to an aspect of the invention, the protection circuit board further includes a central hole; and a connecting member covering the central hole and welded to the electrical connecting assembly through the central hole.

According to an aspect of the invention, the cover case further includes a recessed part that is recessed from an outer edge of the cover case; and the battery pack further includes a label wrapped around the recessed part of the cover case and an outer surface of the rechargeable battery.

According to an aspect of the invention, the side walls of the cover case further include a first side wall disposed on a first side of the cover case and including a first opening; a second side wall disposed on a side of the cover case opposite the first side of the cover case and including a second opening that is offset from the first opening of the first side wall; a first extended part disposed at a first end of the cover plate and connected to the first side wall; and a second extended part disposed at a second end of the cover plate opposite the first end of the cover plate and connected to the second side wall so that the second extended part faces the first extended part.

According to an aspect of the invention, the side walls further include a projection disposed on an inner surface of the first side wall and/or the second side wall; and the protection circuit board is mounted between the projection and the cover plate.

According to an aspect of the invention, the second opening of the second side wall is offset from the first opening of the first side wall so that no portion of the second opening faces any portion of the first opening.

According to an aspect of the invention, the second opening of the second side wall is offset from the first opening of the first side wall so that a first virtual line extending parallel to the cover plate and perpendicular to the first side wall from an end of the first opening that is closest to the first end of the cover plate is spaced apart from a second virtual line extending parallel to the cover plate and the first virtual line and perpendicular to the second side wall from an end of the second opening that is closest to the second end of the cover plate.

According to an aspect of the invention, the first virtual line is spaced apart from the second virtual line by a distance that is equal to or greater than a width of the protection circuit board.

According to an aspect of the invention, the protection circuit board further includes a first projected part disposed at a first end of the protection circuit board, and a second projected part disposed at a second end of the protection circuit board opposite the first end of the protection circuit board; the first extended part of the side walls includes a first receiving part to receive the first projected part of the protection circuit board when the protection circuit board is mounted between the side walls of the cover case; and the second extended part of the side walls includes a second receiving part to receive the second projected part of the protection circuit board when the protection circuit board is mounted between the side walls of the cover case.

According to an aspect of the invention, a board assembly for a rechargeable battery includes a circuit board including a circuit to monitor a condition of the rechargeable battery and/or control an operation of the rechargeable battery; and a cover case including a cover plate contacting a surface of the circuit board; a first side wall contacting a first edge of the circuit board extending parallel to a direction of a greatest dimension of the circuit board, the first side wall including a first opening; and a second side wall facing the first side wall and contacting a second edge of the circuit board extending parallel to the first edge of the circuit board, the second side wall including a second opening that is offset from the first opening.

According to an aspect of the invention, the first opening and the second opening have respective widths that enable the cover case to be placed on the circuit board in a first position in which the cover plate contacts the surface of the circuit board and the cover case is positioned obliquely or perpendicularly with respect to the circuit board, and to be rotated from the first position to a second position in which the cover plate contacts the surface of the circuit board, the first side wall contacts the first edge of the circuit board, and the second side wall contacts the second edge of the circuit board.

According to an aspect of the invention, the first side wall further includes a first projection disposed on an inner surface of the first side wall; the second side wall further includes a second projection disposed on an inner surface of the second side wall; and the first projection and the second projection hold the cover case against the circuit board.

Additional aspects and/or advantages of the invention will be set forth in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1A:
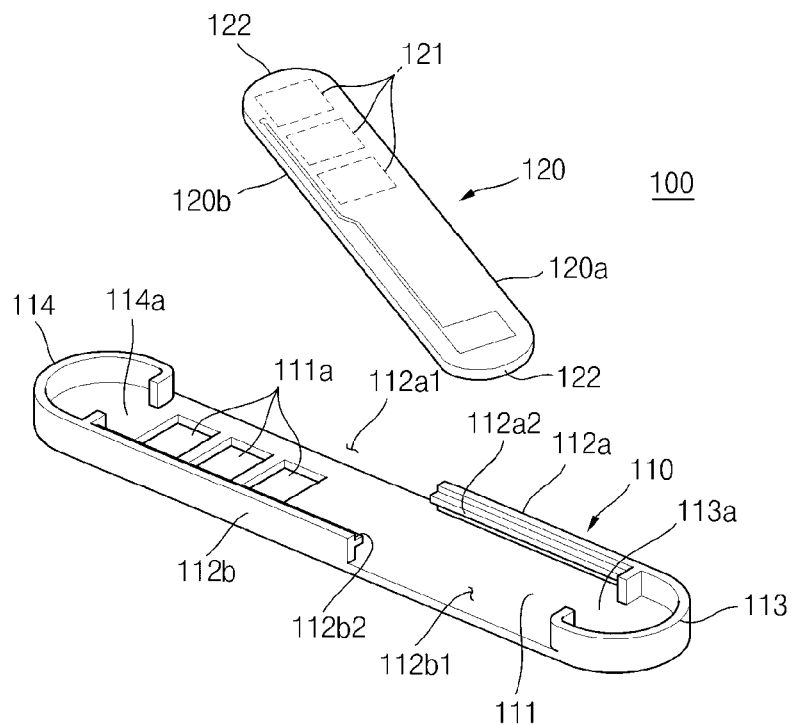
FIG. 1A is an exploded perspective view of a board assembly for a rechargeable battery according to an aspect of the invention.

Reference will now be made in detail to embodiments of the invention, examples of which are shown in the accompanying drawings, wherein like reference numerals refer to like elements. The embodiments are described below in order to explain the invention by referring to the figures.

Figure 1B:
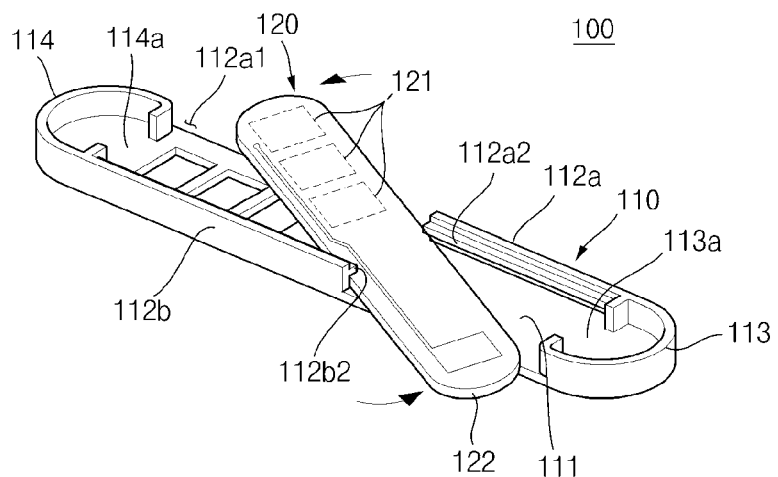
FIG. 1B is a perspective view of an interim assembly state of the board assembly of FIG. 1A according to an aspect of the invention in which a circuit board is obliquely positioned on a cover case.
Figure 1C:
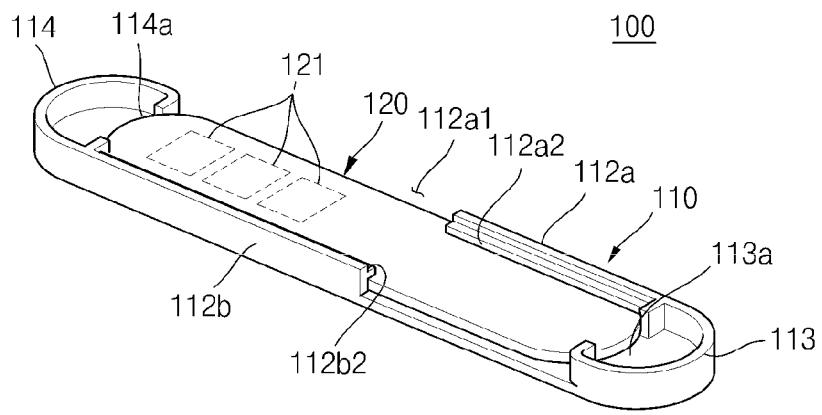
FIG. 1C is a perspective view of a final assembly state of the board assembly of FIG. 1A according to an aspect of the invention in which the circuit board has been mounted on the cover case by rotating the circuit board in the direction of the arrows shown in FIG. 1B.

FIG. 1A is an exploded perspective view of a board assembly for a rechargeable battery according to an aspect of the invention. FIG. 1B is a perspective view of an interim assembly state of the board assembly of FIG. 1A according to an aspect of the invention in which a circuit board is obliquely positioned on a cover case. FIG. 1C is a perspective view of a final assembly state of the board assembly of FIG. 1A according to an aspect of the invention in which the circuit board has been mounted on the cover case by rotating the circuit board in the direction of the arrows shown in FIG. 1B.

Referring to FIGS. 1A-1C, a board assembly 100 for a rechargeable battery includes a cover case 110 and a circuit board 120.

The cover case 110 includes a cover plate 111 and side walls 112a and 112b. The cover case 110 may be formed by injection molding or any other suitable method.

The cover plate 111 includes side walls 112a and 112b longitudinally formed on opposite sides of the cover plate 111. A widest surface of the cover plate 111 contacts a widest surface of the circuit board 120.

The side walls 112a and 112b are substantially perpendicular to the cover plate 111, and include openings 112a1 and 112b1 that are offset from each other. The side walls 112a and 112b include a first side wall 112a and a second side wall 112b. The first side wall 112a is longitudinally formed on a first side of the cover plate 111, and includes a first opening 112a1. The second side wall 112b is longitudinally formed on a second side of the cover plate 111 facing the first opening 112a, and includes a second opening 112b1 facing the first side wall 112a. In FIGS. 1A-1C, the first opening 112a1 and the second opening 112b1 are offset from each other so that no portion of the second opening 112b1 faces any portion of the first opening 112a1.

The circuit board 120 is mounted between the side walls 112a and 112b of the cover case 110. The circuit board 120 may include a circuit unit (not shown) that performs electrical functions. As shown in FIG. 1A, the circuit board 120 has a first edge 120a extending parallel to a direction of a greatest dimension of the circuit board 120, and a second edge 120b extending parallel to the first edge 120a of the circuit board 120.

The circuit board 120 is assembled with the cover case 110 by rotating the circuit board 120 relative to the cover case 110 from a first position as shown in FIG. 1B to a second position as shown in FIG. 1C so that the circuit board 120 contacts the cover plate 111 and is mounted between the side walls 112a and 112b of the cover case 110. More particularly, the circuit board 120 is obliquely positioned on the cover plate 111 between the openings 112a1 and 112b1 of the cover case 110 in the first position as shown in FIG. 1B. Then, the circuit board 120 is rotated in the direction of the arrows shown in FIG. 1B so that the circuit board 120 is mounted between the side walls 112a and 112b of the cover case 110 in the second position as shown in FIG. 1C. In the second position as shown in FIG. 1C, the first side wall 112a of the cover case 110 contacts the first edge 120a of the circuit board 120 extending parallel to the direction of the greatest dimension of the circuit board 120, and the second side wall 112b of the cover case 110 contacts the second edge 120b of the circuit board 120 extending parallel to the first edge 120a of the circuit board 120. Accordingly, the circuit board 120 can be easily assembled with the cover case 110. The circuit board 120 may be fastened to the cover case 110 by an adhesive, a hook connection, tape, or any other suitable method.

The circuit board 120 further includes terminals 121. Terminal holes 111a corresponding to the terminals 121 are formed in the cover plate 111. Accordingly, when the circuit board 120 is assembled with the cover case 110 by rotation, the terminals 121 can be exposed through the terminal holes 111a, thereby enabling an electronic device to be connected to the terminals 121. Although three terminals 121 are shown in FIGS. 1A-1C, any suitable number of terminals 121 can be provided.

The cover case 110 further includes a first extended part 113 and a second extended part 114 respectively connected to the side walls 112a and 112b.

The first extended part 113 is formed at a first end of the cover plate 111, and is connected to the first side wall 112a. Although the first extended part 113 is shown as having an arc shape, it is not limited to such a shape. For example, the first extended part 113 may be formed perpendicular to the first side wall 112a.

The second extended part 114 is formed at a second end of the cover plate 111 opposite to the first end of the cover plate 111 so that the second extended part faces the first extended part 113, and is connected to the second side wall 112b. Although the second extended part 114 is shown as having an arc shape, it is not limited to such a shape. For example, the second extended part 114 may be formed perpendicular to the second side wall 112b.

Thus, the first and second extended parts 113 and 114 can insulate the end portions of the circuit board 120 by surrounding the end portions.

Referring to FIG. 1A, projected parts 122 are formed at opposite ends of the circuit board 120. A first receiving part 113a is formed in the first extended part 113, and a second receiving part 114a is formed in the second extended part 114. Thus, when the circuit board 120 having the projected parts 122 is rotated in the direction of the arrows shown in FIG. 1B so that the circuit board 120 is mounted between the first and second side walls 112a and 112b of the cover case 110 as shown in FIG. 1C, the projected parts 122 formed at opposite ends of the circuit board 120 are inserted into the first receiving part 113a and the second receiving part 114a as shown in FIG. 1C, thereby preventing any further rotation of the circuit board 120. Although the projected parts 122 are shown as having an arc shape in FIGS. 1A-1C, the projected parts 122 may be modified to have various shapes according to the shapes of the first and second receiving parts 113a and 114a and the way in which the protected parts 122 fit together with the first and second receiving parts 113a and 114a.

In addition, a first projection 112a2 is formed on an inner surface of the first side wall 112a, and a second projection 112b2 is formed on an inner surface of the second side wall 112b. The first projection 112a2 and the second projection 112b2 may be formed as a single rib shape on the inner surface of the side walls 112a and 112b as shown in FIGS. 1A-1C, or may be formed as a plurality of ribs spaced along the inner surface of the side walls 112a and 112b. Thus, when the circuit board 120 is obliquely positioned on the cover plate 111 between the first opening 112a1 and second opening 112b1 and assembled with the cover case 110 by rotation, the circuit board 120 is hooked by the first projection 112a2 and the second projection 112b2, thereby preventing the circuit board 120 from moving in a perpendicular direction relative to the cover plate 111.

Figure 2A:
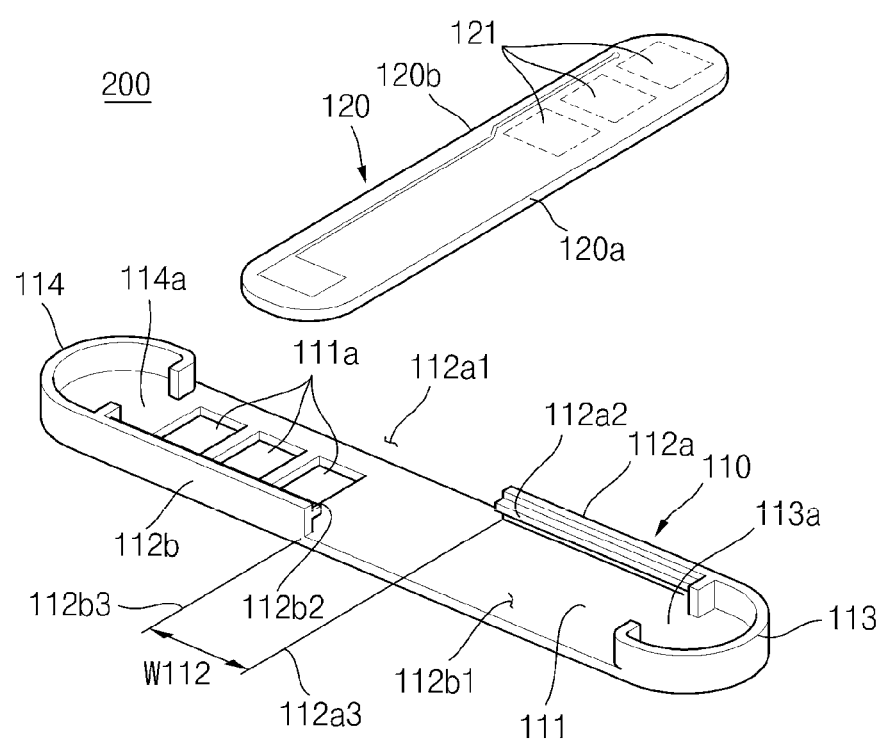
FIG. 2A is an exploded perspective view of a board assembly for a rechargeable battery according to an aspect of the invention.
Figure 2B:
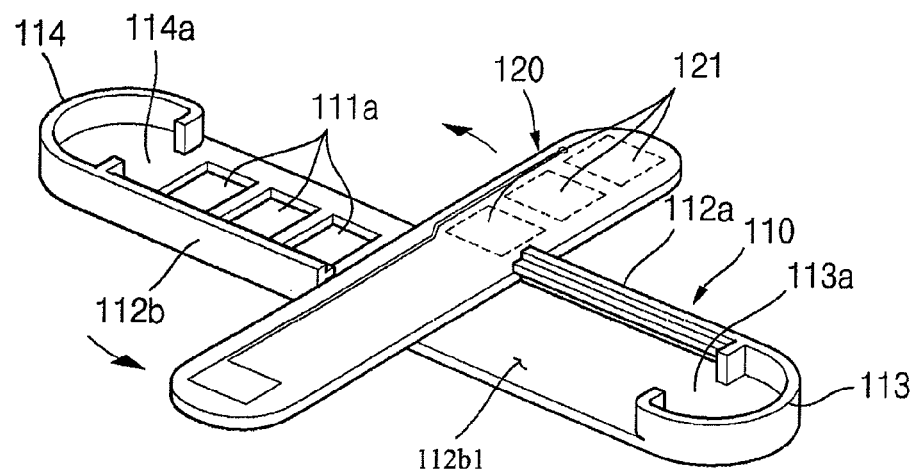
FIG. 2B is a perspective view of an interim assembly state of the board assembly of FIG. 2A according to an aspect of the invention in which a circuit board is perpendicularly positioned on a cover case.
Figure 2C:
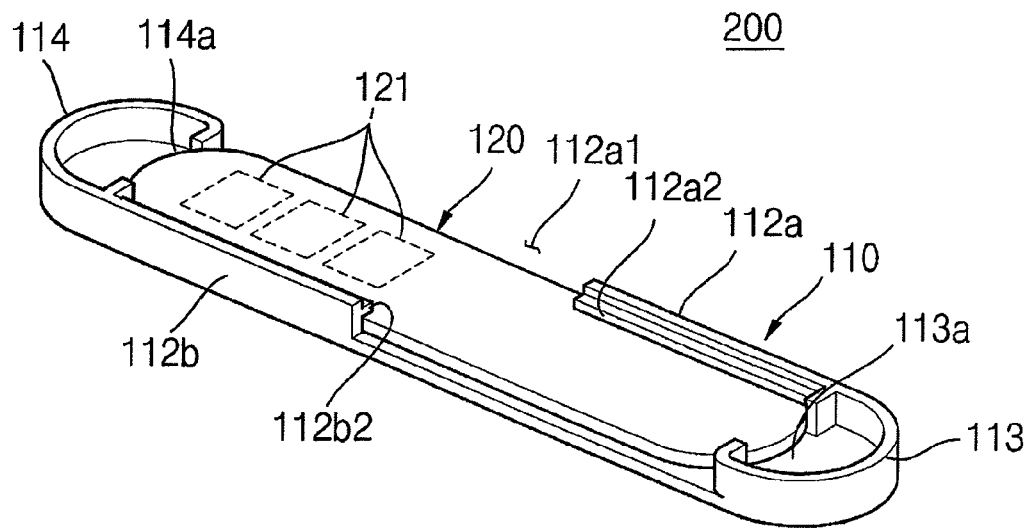
FIG. 2C is a perspective view of a final assembly state of the board assembly of FIG. 2A according to an aspect of the invention in which the circuit board has been mounted on the cover case by rotating the circuit board in the direction of the arrows shown in FIG. 2B.

FIG. 2A is an exploded perspective view of a board assembly for a rechargeable battery according to an aspect of the invention. FIG. 2B is a perspective view of an interim assembly state of the board assembly of FIG. 2A according to an aspect of the invention in which a circuit board is perpendicularly positioned on a cover case. FIG. 2C is a perspective view of a final assembly state of the board assembly of FIG. 2A according to an aspect of the invention in which the circuit board has been mounted on the cover case by rotating the circuit board in the direction of the arrows shown in FIG. 2B.

FIGS. 2A-2C are similar to FIGS. 1A-1C, except that the first and second openings 112a1 and 112b1 of the first and second side walls 112a and 112b are wider in FIGS. 2A-2C than they are in FIGS. 1A-1C. Referring to FIGS. 2A-2C, in a board assembly 200 for a rechargeable battery, the first and second openings 112a1 and 112b1 of the first and second side walls 112a and 112b are offset from each other so that a first virtual line 112a3 extending parallel to the cover plate 111 and perpendicular to the first side wall 112a from an end of the first opening 112a1 that is closed to a first end of the cover plate 111 at which the first extended portion 113 is disposed is spaced apart by a distance W112 from a second virtual line 112b3 extending parallel to the cover plate 111 and the first virtual line 112a3 and perpendicular to the second side wall 112n from an end of the second opening 112b1 that is closes to a second end of the cover plate 111 at which the second extended part 114 is disposed. In FIGS. 2A-2C, the distance W112 is substantially equal to a width of the circuit board 120, but may be equal to or greater than the width of the circuit board 120.

When the circuit board 120 is positioned on the cover plate 111 within a region defined by the distance W112 between the first and second virtual lines 112a3 and 112b3 in a first position as shown in FIG. 2B, the cover case 110 and the circuit board 120 are substantially perpendicular to each other. When the circuit board 120 is rotated in the direction of the arrows shown in FIG. 2B, the circuit board 120 is inserted and fixed between the first and second side walls 112a and 112b in a second position as shown in FIG. 2C. In the second position as shown in FIG. 2C, the first side wall 112a of the cover case 110 contacts the first edge 120a of the circuit board 120 extending parallel to the direction of the greatest dimension of the circuit board 120, and the second side wall 112b of the cover case 110 contacts the second edge 120b of the circuit board 120 extending parallel to the first edge 120a of the circuit board 120.

Accordingly, the cover case 110 can be relatively easily assembled with the circuit board 120 due to the width of the region defined by the distance W112.

Figure 3A:
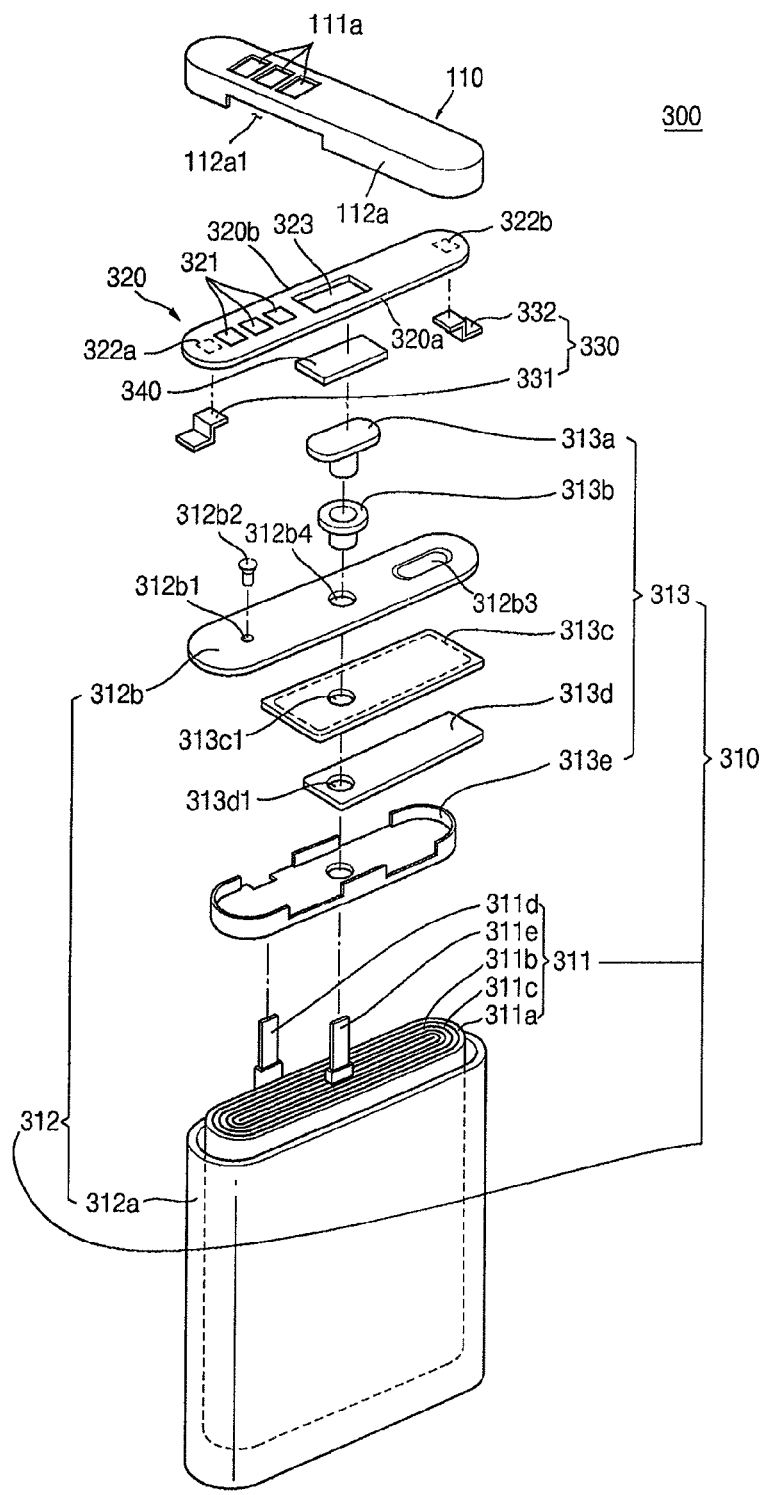
FIG. 3A is an exploded perspective view of a battery pack according to an aspect of the invention.
Figure 3B:
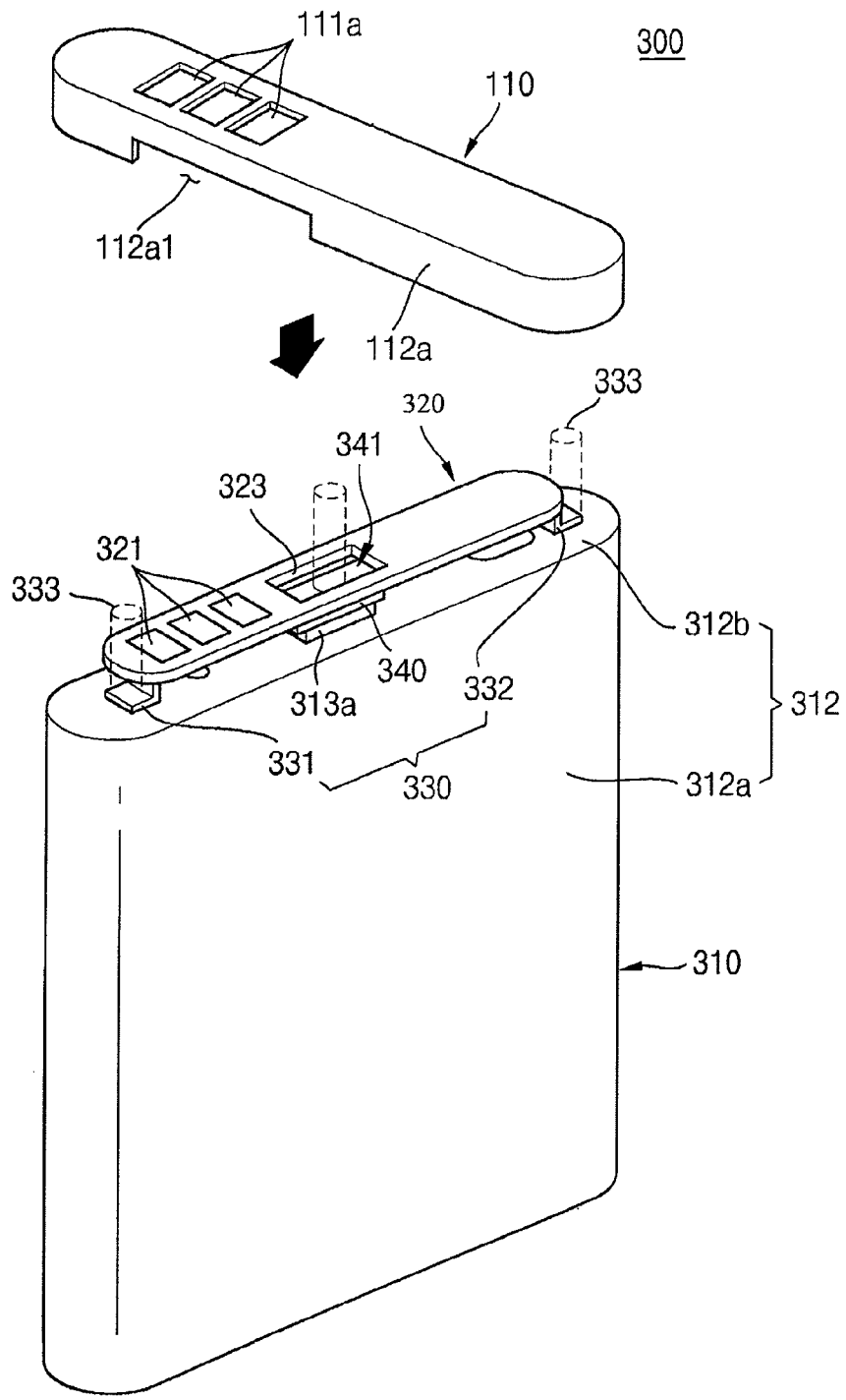
FIG. 3B is a partial exploded perspective view of the battery pack of FIG. 3A according to an aspect of the invention assembled except for a cover case, in which a protection circuit board has been mounted using welding.
Figure 3C:
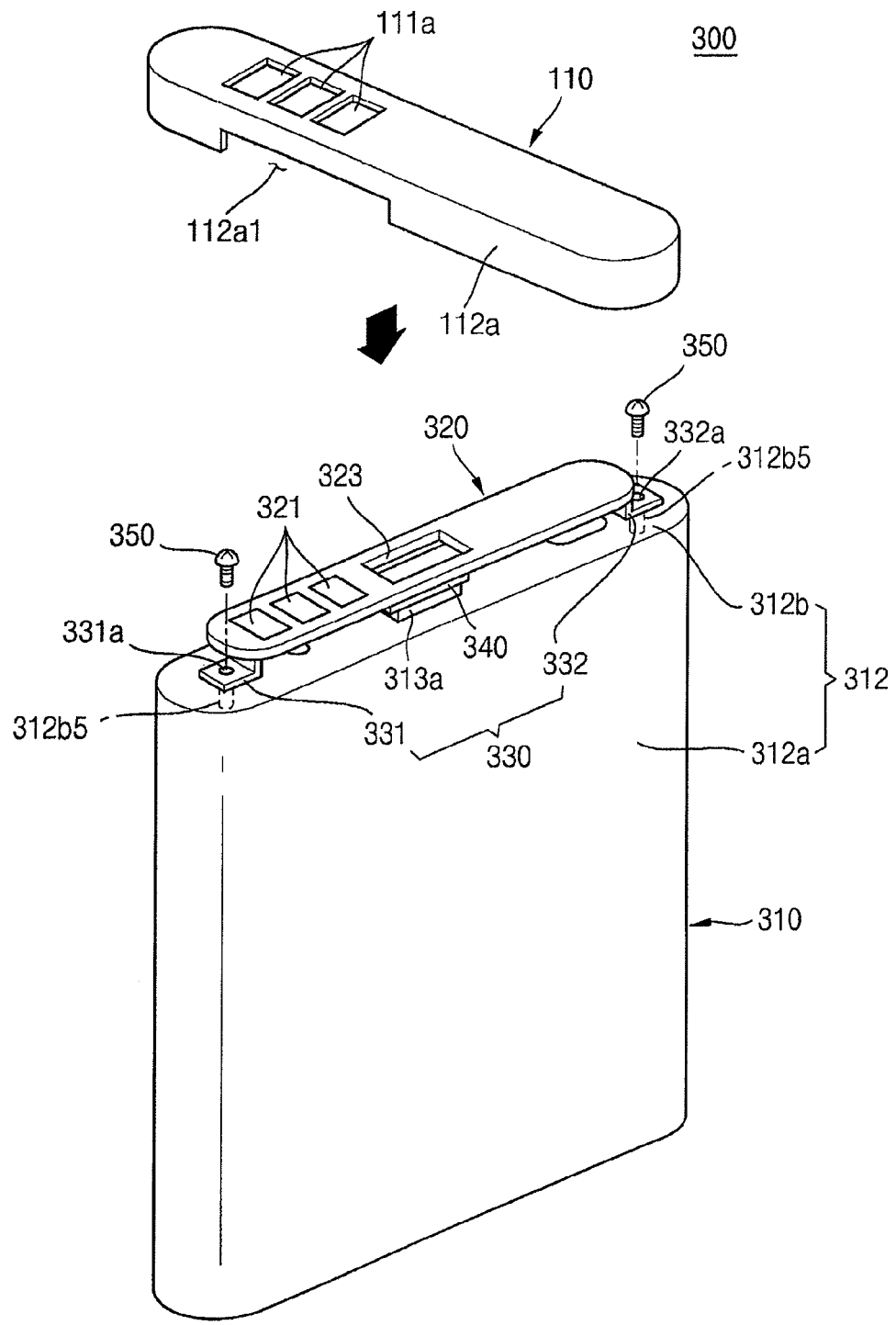
FIG. 3C is a partial exploded perspective view of the battery pack of FIG. 3A according to an aspect of the invention assembled except for the cover case, in which the protection circuit board has been mounted using threaded fasteners.
Figure 3D:
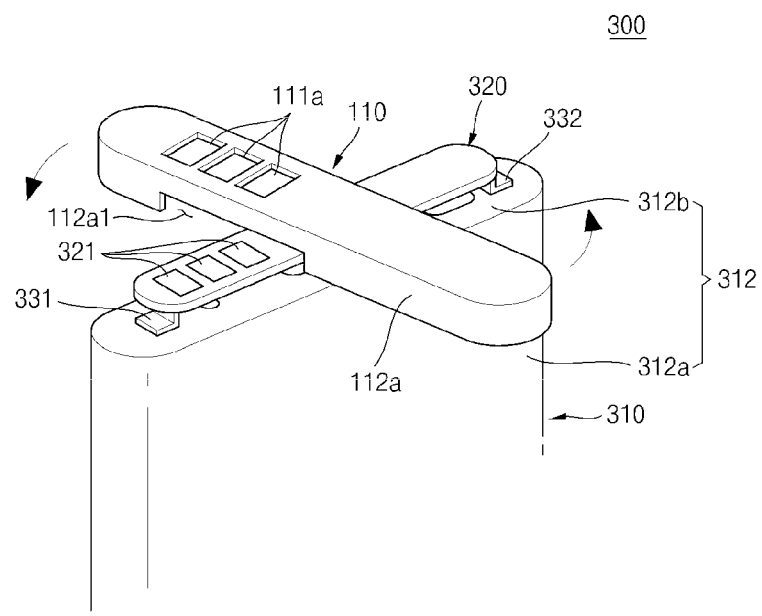
FIG. 3D is a perspective view of an interim assembly state of the battery pack of FIG. 3A according to an aspect of the invention in which the cover case is perpendicularly positioned on the protection circuit board.
Figure 3E:
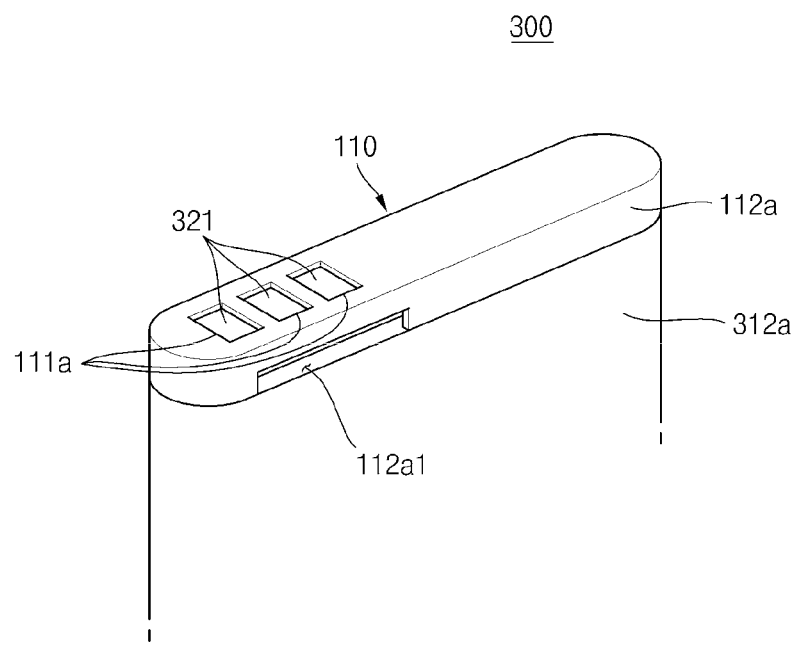
FIG. 3E is a perspective view of a final assembly state of the battery pack of FIG. 3A according to an aspect of the invention in which the cover case has been mounted on the protection circuit board by rotating the cover case in the direction of the arrows shown in FIG. 3D.

FIG. 3A is an exploded perspective view of a battery pack according to an aspect of the invention. FIG. 3B is partial exploded perspective view of the battery pack of FIG. 3A according to an aspect of the invention assembled except for a cover case, in which a protection circuit board has been mounted using welding. FIG. 3C is a partial exploded perspective view of the battery pack of FIG. 3A according to an aspect of the invention assembled except for the cover case, in which the protection circuit board has been mounted using threaded fasteners. FIG. 3D is a perspective view of an interim assembly state of the battery pack of FIG. 3A according to an aspect of the invention in which the cover case is perpendicularly positioned on the protection circuit board. FIG. 3E is a perspective view of a final assembly state of the battery pack of FIG. 3A according to an aspect of the invention in which the cover case has been mounted on the protection circuit board by rotating the cover case in the direction of the arrows shown in FIG. 3D.

Referring to FIGS. 3A-3C, a battery pack 300 includes a battery 310, a cover case 110, and a protection circuit board 320. In the battery pack 300, the protection circuit board 320 mounted on the battery 310 is easily assembled with the cover case 110 by rotation.

The battery 310 includes a cathode and an anode, and is rechargeable. The battery 310 further includes an electrode assembly 311, an enclosing assembly 312, and an electrical connecting assembly 313.

The electrode assembly 311 is a wound type electrode assembly formed by laminating and winding a cathode plate 311a, an anode plate 311b, and a separator 311c interposed between the cathode plate 311a and the anode plate 311b, and includes a cathode tab 311d connected to the cathode plate 311a, and an anode tab 311e connected to the anode plate 311b.

The cathode plate 311a includes a cathode collector and a cathode active material layer. The cathode active material layer typically includes a compound containing lithium, a binder improving adhesion, and a conductive material improving conductivity. The cathode collector is usually made of aluminum, functions as a transfer passage for charges generated in the cathode active material layer, and supports the cathode active material layer. The cathode active material layer is coated on the wide surfaces of the cathode collector. Also, the cathode tab 311d is formed at one end of the cathode plate 311a.

The anode plate 311b includes an anode collector and an anode active material layer. The anode active material layer typically includes hard carbon or graphite particles, and a binder improving adhesion. The anode collector is usually made of copper, functions as a transfer passage for charges generated in the anode active material layer, and supports the anode active material layer. Also, the anode tab 311e is formed at one end of the anode plate 311b.

The separator 311c is interposed between the cathode plate 311a and the anode plate 311b to electrically insulate the cathode plate 311a from the anode plate 311b, and allows charges to pass between the cathode plate 311a and the anode plate 311b. The separator 311c is typically made of polyethylene (PE) or polypropylene (PP), but can be made of any suitable material.

The enclosing assembly 312 includes a can 312a and a cap plate 312b.

The can 312a has an open end. The electrode assembly 311 is inserted into the open end of the can 312a. The can 312a may be formed of a conductive material, such as aluminum or an aluminum alloy.

The cap plate 312b closes the open end of the can 312a. The cap plate 312b may be fastened to the can 312a by laser welding an area where the cap plate 312b contacts the can 312a around the open end of the can 312a. The cap plate 312b may be formed of aluminum or an aluminum alloy.

A hole 312b1 for injecting an electrolyte into the can 312a is formed in the cap plate 312b, and is closed by a plug 312b2. Although FIG. 3A shows the hole 312b1 being formed in the cap plate 312b, the hole 312b1 may be formed in the can 312a instead.

The enclosing assembly 312 enclosing the electrode assembly 311 is provided with a safety vent 312b3 that opens when an internal pressure in the enclosing assembly 312 increases above a critical value. Although FIG. 3A shows the safety vent 312b3 being formed in the cap plate 312b, the safety vent 312b3 may be formed in the can 312a instead.

The electrical connecting assembly 313 is electrically connected to the electrode assembly 311, and forms a positive terminal and/or a negative terminal of the battery 310. The electrical connecting assembly 313 may be fastened to the can 312a or the cap plate 312b. In the following description, examples in which the electrical connecting assembly 313 is fastened to the cap plate 312b will be described.

The electrical connecting assembly 313 includes an electrode terminal 313a, an insulating gasket 313b, an insulating plate 313c, a terminal plate 313d, and an insulating case 313e.

The electrode terminal 313a is inserted into a central hole 312b4 formed in the cap plate 312b.

The insulating gasket 313b is interposed between the central hole 312b4 and the electrode terminal 313a to electrically insulate the electrode terminal 313a from the cap plate 312b.

The insulating plate 313c is inserted between the terminal plate 313d and the cap plate 312b to electrically insulate them from each other. A hole 313c1 is formed in the insulating plate 313c, and the electrode terminal 313a passes through the hole 313c1.

The terminal plate 313d includes a hole 313d1. An end of the electrode terminal 313a is joined with the hole 313d1. The anode tab 311e is electrically connected to the terminal plate 313d. The terminal plate 313d is made of a conductive metal, and is electrically connected to the electrode terminal 313a.

The insulating case 313e insulates the upper surface of the electrode assembly 311 from the cathode tab 311d and the anode tab 311e to prevent an electrical short between the cathode tab 311d and the anode tab 311e, and insulates the terminal plate 313d from the upper surface of the electrode assembly 311.

The cover case 110 has already been described above in connection with FIGS. 1A-2C, and so a description thereof will be omitted here.

The protection circuit board 320 has basically the same construction as the circuit board 120 described above in connection with FIGS. 1A-2C, and only differences between the two will be explained below. The protection circuit board 320 is typically made by forming a printed circuit pattern (not shown) constituted by a thin conductive film such as copper foil on an insulating substrate made of an epoxy or a Bakelite resin, and installing a protection circuit unit (not shown) on the printed circuit pattern. The protection circuit unit is typically constituted by electrical elements such as passive elements, active elements, and a protection circuit. The protection circuit unit manages operating conditions of the battery. The protection circuit unit checks a remaining capacity of the battery, and charges/discharges the battery by selecting a suitable charging method. The protection circuit unit stores information about voltage, current, temperature, and the remaining capacity of the battery, and outputs the stored information by communicating with external devices.

The protection circuit board 320 includes a mounting assembly 330. The mounting assembly 330 mounts the protection circuit board 320 on the enclosing assembly 312. In addition, the mounting assembly 330 electrically connects the protection circuit board 320 to the enclosing assembly 312, which serves as a cathode. As one example of mounting the protection circuit board 320 on the enclosing assembly 312, the protection circuit board 320 includes conductive pads 322a and 322b at opposite ends of the protection circuit board 320, one end of the mounting assembly 330 is soldered to the conductive pads 322a and 322b, and the other end of the mounting assembly 330 is welded to the enclosing assembly 312 after being placed in contact with the enclosing assembly 312. FIGS. 3A-3C show examples in which the mounting assembly 330 is fastened to the cap plate 312b of the enclosing assembly 312, but any suitable method of fastening the mounting assembly 330 to the enclosing assembly 312 may be used.

As shown in FIG. 3A, the mounting assembly 330 includes a first mounting member 331 and a second mounting member 332 each formed in a step shape. One end of the first mounting member 331 is soldered to the conductive pad 322a at a first end of the protection circuit board 320, and the other end of the first mounting member 331 is placed in contact with the cap plate 312b as shown in FIG. 3B. One end of the second mounting member 332 is soldered to the conductive pad 322b at a second end of the protection circuit board 320, and the other end of the second mounting member 322 is placed in contact with the cap plate 312b. The first and second mounting members 331 and 332 are bent twice to form a step shape to provide a welding region that contacts the cap plate 312b as shown in FIG. 3B so that the first and second mounting members 331 and 332 can be welded to the cap plate 312b from a direction perpendicular to the cap plate 312b as indicated by the dashed cylinders 333 in FIG. 3B using, for example, laser welding.

Alternatively, the mounting assembly 330 can be fastened to the enclosing assembly 312 using threaded fasteners. As shown in FIG. 3C, holes 331a and 332a are formed in the first mounting member 331 and the second mounting member 332, respectively, and threaded holes 312b5 are formed in the cap plate 312b. Machine screws 350 passing through the holes 331a and 332a in the first and second mounting members 331 and 332 are screwed into the tapped holes 312b5 in the cap plate 312b to fasten the first and second mounting members 331 and 332 to the cap plate 312b5. However, other types of threaded fasteners can be used instead of the machine screws 350. Alternatively, threaded shafts can be provided on the cap plate 312b to extend through the holes 331a and 331b in the first and second mounting members 331 and 332, and threaded nuts can be screwed onto the threaded shafts to fasten the first and second mounting members 331 and 332 to the cap plate 312b. Although two threaded fasteners are shown in FIG. 3C, any suitable number of threaded fasteners can be provided.

As shown in FIGS. 3A-3C, the protection circuit board 320 includes terminals 321, a central hole 323, and a connecting member 340 that covers the central hole 323 in the protection circuit board 320 and is soldered to the protection circuit board 320. As shown in FIG. 3A, the protection circuit board 320 has a first edge 320a extending parallel to a direction of a greatest dimension of the protection circuit board 320, and a second edge 320b extending parallel to the first edge 320a of the protection circuit board 320. The connecting member 340 is connected to the electrode terminal 313a of the electrical connecting assembly 313 by welding from a direction perpendicular to the cap plate 312b as indicated by the dashed cylinder in FIG. 3B using, for example, laser welding. As shown in FIG. 3B, the connecting member 340 contacts the electrode terminal 313a of the electrical connecting assembly 313 when the protection circuit board 320 is mounted on the enclosing assembly 312. As shown in FIG. 3B, a welding aperture 341 is formed by the central hole 323 of the protection circuit board 320, and the connecting member 340 is welded to the electrode terminal 313a through the welding aperture 341 from a direction perpendicular to the cap plate 312b as indicated by the dashed cylinder in FIG. 3B using, for example, laser welding, thereby connecting the protection circuit board 320 to the electrode terminal 313a of the electrical connecting assembly.

As shown in FIG. 3D, after the protection circuit board 320 has been electrically connected to the battery 310 as shown in FIG. 3B or 3C, the cover case 110 is positioned on the protection circuit board 320 so that the protection circuit board 320 is inserted into the first and second openings 112a1 and 112b1 of the cover case 110 so that the protection circuit board 320 is perpendicularly positioned on the protection circuit board 320 in a first position as shown in FIG. 3D. Then, the cover case 110 is rotated in the direction of the arrows shown in FIG. 3D so that the protection circuit board 320 is mounted between the first and second side walls 112a and 112b of the cover case 110 in a second position as shown in FIG. 3E, thereby providing the completed battery pack 300 shown in FIG. 3E. In the second position as shown in FIG. 3E, the first side wall 112a of the cover case 110 contacts the first edge 320a of the protection circuit board 320 extending parallel to the direction of the greatest dimension of the protection circuit board 320, and the second side wall 112b of the cover case 110 contacts the second edge 320b of the protection circuit board 120 extending parallel to the first edge 320a of the protection circuit board 120. Thus, the cover case 110 can be very easily assembled with the protection circuit board 320.

Figure 4:
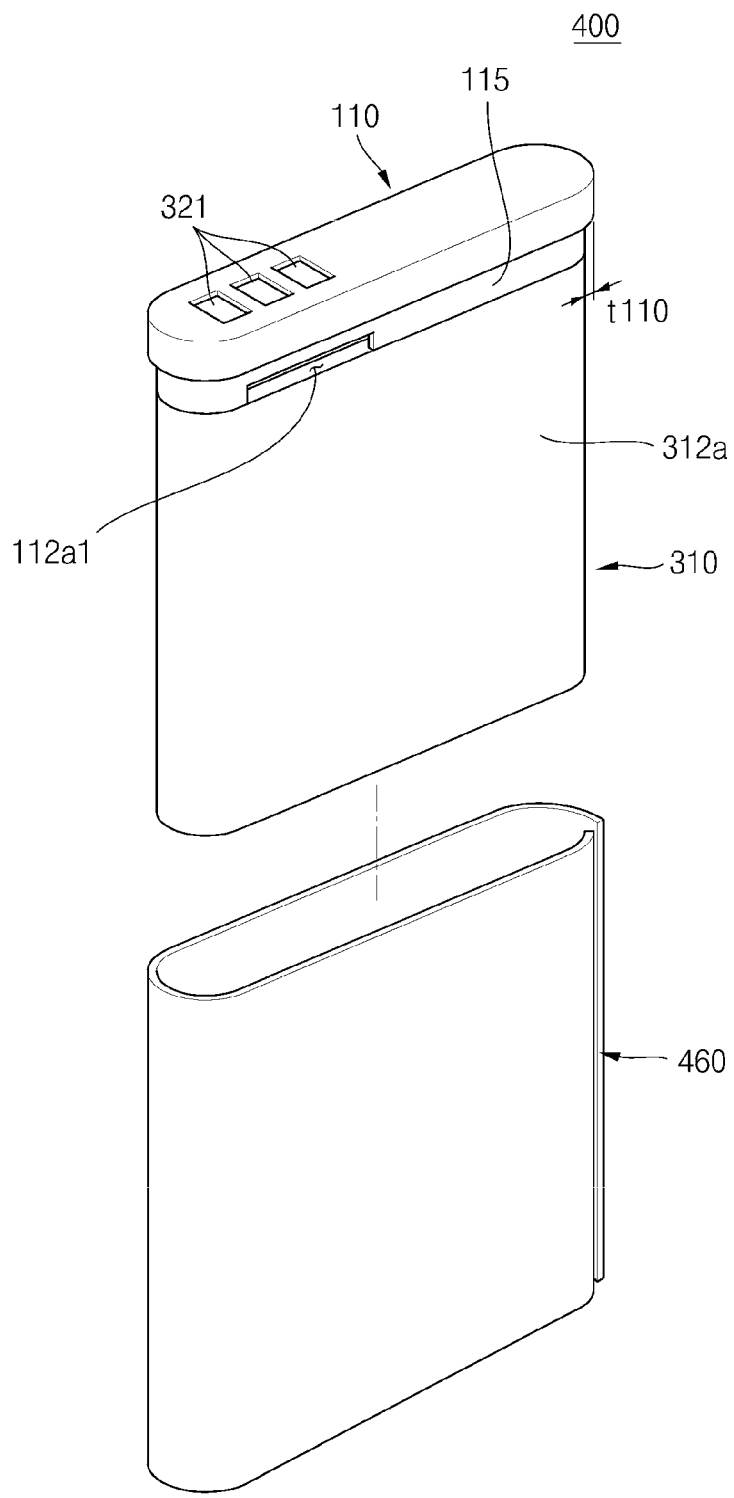
FIG. 4 is an exploded perspective view of a battery pack according to an aspect of the invention.

FIG. 4 is an exploded perspective view of a battery pack according to an aspect of the invention.

As shown in FIG. 4, a cover case 110 of a battery pack 400 includes a recessed part 115 that is recessed by a distance t110 from the outer edge of the cover case 110. A label 460 is wrapped around the recessed part of 115 of the cover case and the outer surface of the battery 310. An adhesive may be applied to the inner surface of the label 460 to strengthen a binding force between the cover case 110 and the battery 310. The label 460 may have a thickness that is substantially equal to the distance t110.

Although several embodiments of the invention have been shown and described, it would be appreciated by those skilled in the art that changes may be made in these embodiments without departing from the principles and spirit of the invention, the scope of which is defined by the claims and their equivalents.

What is claimed is:

1. A board assembly for a rechargeable battery, comprising:
   a cover case comprising:
      a cover plate; and
      longer and shorter side walls disposed on a circumference of the cover plate and comprising respective openings that are formed in the longer side walls facing each other and are offset from each other; and
   a circuit board mounted between the side walls of the cover case.

2. The board assembly of claim 1, wherein:
   the circuit board comprises a terminal; and
   the cover case further comprises a terminal hole corresponding to the terminal of the circuit board.

3. A board assembly for a rechargeable battery, comprising:
   a cover case comprising:
      a cover plate; and
      side walls disposed on a circumference of the cover plate and comprising respective openings that are offset from each other; and
   a circuit board mounted between the side walls of the cover case,
   wherein the side walls of the cover case further comprise:
   a first side wall disposed on a first side of the cover case and comprising a first opening;
   a second side wall disposed on a second side of the cover case opposite the first side of the cover case and comprising a second opening that is offset from the first opening of the first side wall;
   a first extended part disposed at a first end of the cover plate and connected to the first side wall; and
   a second extended part disposed at a second end of the cover plate opposite the first end of the cover plate and connected to the second side wall so that the second extended part faces the first extended part.

4. The board assembly of claim 3, wherein:
   the side walls further comprise a projection disposed on an inner surface of the first side wall and/or the second side wall; and
   the circuit board is mounted between the projection and the cover plate.

5. The board assembly of claim 3, wherein the second opening of the second side wall is offset from the first opening of the first side wall so that no portion of the second opening faces any portion of the first opening.

6. The board assembly of claim 3, wherein the second opening of the second side wall is offset from the first opening of the first side wall so that a first virtual line extending parallel to the cover plate and perpendicular to the first side wall from an end of the first opening that is closest to the first end of the cover plate is spaced apart from a second virtual line extending parallel to the cover plate and the first virtual line and perpendicular to the second side wall from an end of the second opening that is closest to the second end of the cover plate.

7. The board assembly of claim 6, wherein the first virtual line is spaced apart from the second virtual line by a distance that is equal to or greater than a width of the circuit board.

8. The board assembly of claim 3, wherein:
   the circuit board comprises:
      a first projected part disposed at a first end of the circuit board; and
      a second projected part disposed at a second end of the circuit board opposite the first end of the circuit board;
   the first extended part of the side walls comprises a first receiving part to receive the first projected part of the circuit board when the circuit board is mounted between the side walls of the cover case; and
   the second extended part of the side walls comprises a second receiving part to receive the second projected part of the circuit board when the circuit board is mounted between the side walls of the cover case.

9. A battery pack comprising:
   a rechargeable battery comprising:
      a cathode; and
      an anode;
   a cover case comprising:
      a cover plate comprising a charge/discharge terminal hole; and
      longer and shorter side walls disposed on a circumference of the cover plate and comprising respective openings that are formed in the longer side walls facing each other and are offset from each other; and
   a protection circuit board mounted between the side walls of the cover case and electrically connected to the cathode and the anode of the rechargeable battery, the protection circuit board comprising a charge/discharge terminal corresponding to the charge/discharge terminal hole of the cover case.

10. The battery pack of claim 9, wherein the rechargeable battery further comprises:
   an electrode assembly comprising a cathode plate, an anode plate, and a separator interposed between the cathode plate and the anode plate, the cathode plate, the anode plate, and the separator being wound together;
   an enclosing assembly enclosing the electrode assembly; and
   an electrical connecting assembly mounted on the enclosing assembly and electrically connected to the cathode plate and/or the anode plate.

11. The battery pack of claim 10, wherein;
   the protection circuit board further comprises a mounting assembly soldered to both ends of the protection circuit board; and
   the mounting assembly is fastened to the enclosing assembly by welding or at least one threaded fastener to mount the protection circuit board on the enclosing assembly.

12. The battery pack of claim 10, wherein the protection circuit board further comprises:
a central hole; and
a connecting member covering the central hole and welded to the electrical connecting assembly through the central hole.

13. The battery pack of claim 9, wherein
the cover case further comprises a recessed part that is recessed from an outer edge of the cover case; and
the battery pack further comprises a label wrapped around the recessed part of the cover case and an outer surface of the rechargeable battery.

14. A battery pack comprising:
a rechargeable battery comprising:
a cathode; and
an anode;
a cover case comprising:
a cover plate comprising a charge/discharge terminal hole; and
side walls disposed on a circumference of the cover plate and comprising respective openings that are offset from each other; and
a protection circuit board mounted between the side walls of the cover case and electrically connected to the cathode and the anode of the rechargeable battery, the protection circuit board comprising a charge/discharge terminal corresponding to the charge/discharge terminal hole of the cover case,
wherein the side walls of the cover case further comprise:
a first side wall disposed on a first side of the cover case and comprising a first opening;
a second side disposed on a second side of the cover case opposite the first side of the cover case and comprising a second opening that is offset from the first opening of the first side wall;
a first extended part disposed at a first end of the cover plate and connected to the first side wall; and
a second extended part disposed at a second end of the cover plate opposite the first end of the cover plate and connected to the second side wall so that the second extended part faces the first extended part.

15. The battery pack of claim 14, wherein:
the side walls further comprise a projection disposed on an inner surface of the first side wall and/or the second side wall; and
the protection circuit board is mounted between the projection and the cover plate.

16. The battery pack of claim 14, wherein the second opening of the second side wall is offset from the first opening of the first side wall so that no portion of the second opening faces any portion of the first opening.

17. The battery pack of claim 14, wherein the second opening of the second side wall is offset from the first opening of the first side wall so that a first virtual line extending parallel to the cover plate and perpendicular to the first side wall from an end of the first opening that is closest to the first end of the cover plate is spaced apart from a second virtual line extending parallel to the cover plate and the first virtual line and perpendicular to the second side wall from an end of the second opening that is closest to the second end of the cover plate.

18. The battery pack of claim 17, wherein the first virtual line is spaced apart from the second virtual line by a distance that is equal to or greater than a width of the protection circuit board.

19. The battery pack of claim 14, wherein the protection circuit board further comprises:
a first projected part disposed at a first end of the protection circuit board; and
a second projected part disposed at a second end of the protection circuit board opposite the first end of the protection circuit board;
the first extended part of the side walls comprises a first receiving part to receive the first projected part of the protection circuit board when the protection circuit board is mounted between the side walls of the cover case; and
the second extended part of the side walls comprises a second receiving part to receive the second projected part of the protection circuit board when the protection circuit board is mounted between the side walls of the cover case.

20. A board assembly for a rechargeable battery, comprising:
a circuit board comprising a circuit to monitor a condition of the rechargeable battery and/or control an operation of the rechargeable battery; and
a cover case comprising:
a cover plate contacting a surface of the circuit board;
a first side wall contacting a first edge of the circuit board extending parallel to a direction of a greatest dimension of the circuit board, the first side wall comprising a first opening; and
a second side wall facing the first side wall and contacting a second edge of the circuit board extending parallel to the first edge of the circuit board, the second side wall comprising a second opening that is offset from the first opening.

21. The board assembly of claim 20, wherein the first opening and the second opening have respective widths that enable the cover case to be placed on the circuit board in a first position in which the cover plate contacts the surface of the circuit board and the cover case is positioned obliquely with respect to the circuit board, and to be rotated from the first position to a second position in which the cover plate contacts the surface of the circuit board, the first side wall contacts the first edge of the circuit board, and the second side wall contacts the second edge of the circuit board.

22. The board assembly of claim 20, wherein the first opening and the second opening have respective widths that enable the cover case to be placed on the circuit board in a first position in which the cover plate contacts the surface of the circuit board and the cover case is positioned perpendicularly with respect to the circuit board, and to be rotated from the first position to a second position in which the cover plate contacts the surface of the circuit board, the first side wall contacts the first edge of the circuit board, and the second side wall contacts the second edge of the circuit board.

23. The board assembly of claim 20, wherein:
the first side wall further comprises a first projection disposed on an inner surface of the first side wall;
the second side wall further comprises a second projection disposed on an inner surface of the second side wall; and
the first projection and the second projection hold the cover case against the circuit board.

* * * * *